May 16, 1939.  W. P. HOUSER  2,158,580
LAWN TRIMMER AND EDGER
Filed Nov. 5, 1936
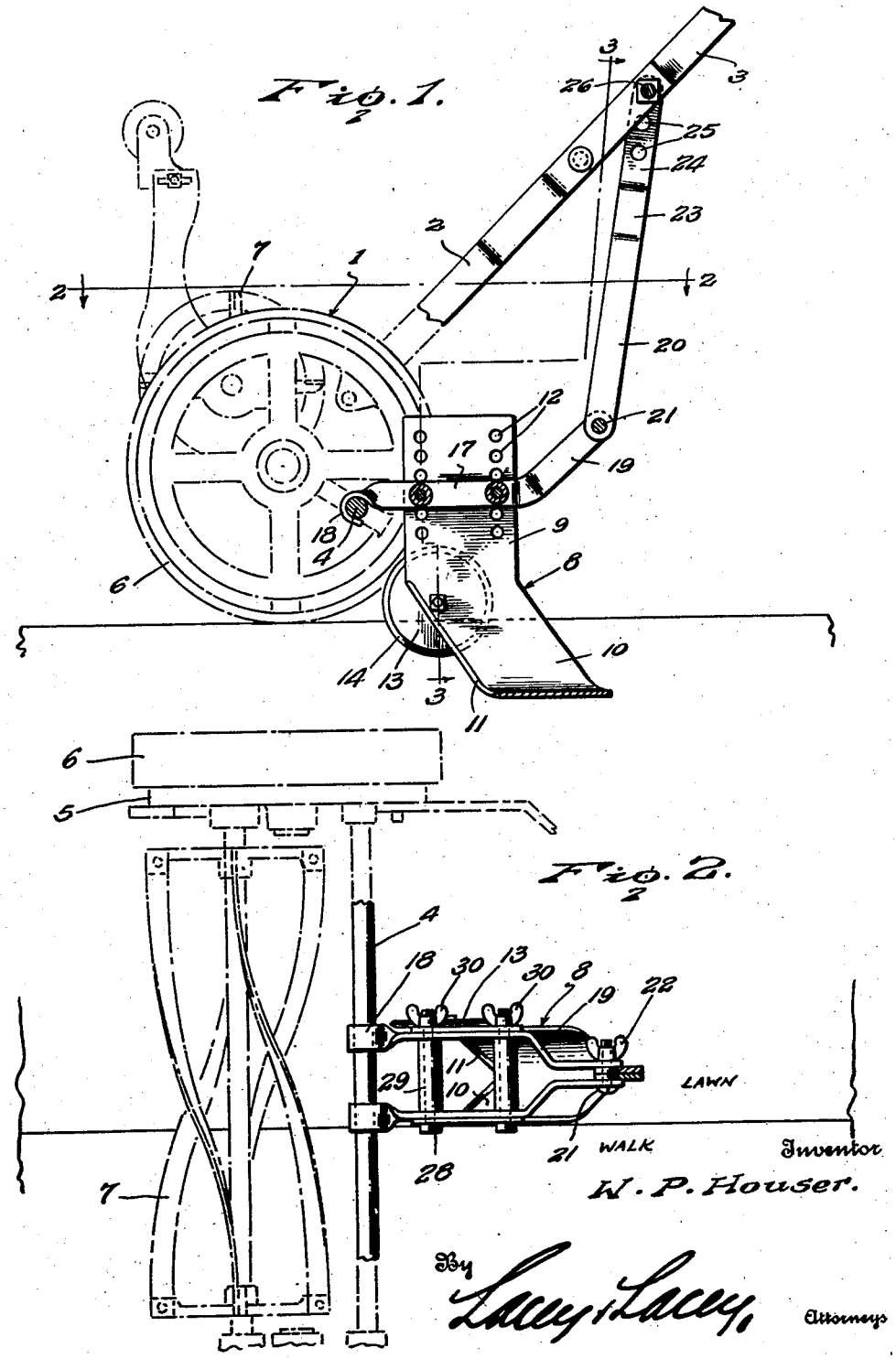
Inventor
W. P. Houser.
By Lacey & Lacey,
Attorneys Patented May 16, 1939

2,158,580

UNITED STATES PATENT OFFICE 2,158,580

LAWN TRIMMER AND EDGER

William P. Houser, Belle Center, Ohio

Application November 5, 1936, Serial No. 109,388

2 Claims. (Cl. 97—227)

This invention relates to an improved lawn trimmer and edger.

It is well recognized that in mowing lawns, it is extremely difficult to cut grass near sidewalks for the reason that, as one wheel of the mower travels on the walk and the other wheel thereof rolls on the grass or sod, one side of the mower will be higher than the other side and the mower will, therefore, cut unevenly.

In order to correct the ragged condition of the grass adjacent the walks, it is usually necessary to trim it by means of hand shears. This method, of course, entails much tiresome back bending on the part of the operator.

One object of my invention is, therefore, to provide a lawn trimmer which will be operable for removing a small amount of sod next to the walk so that the possibility of grass growing adjacent the walk will be eliminated and raggedness of the grass near the walk obviated.

Another object of the invention is to provide a lawn trimmer and edger, the use of which will obviate the tiring job of manually clipping the grass along the edges of sidewalks.

A further object of the invention is to provide a lawn trimmer and edger which may be readily attached to a lawn mower, wheeled hoe, garden plow, or the like, or which may be operated as a hand tool independently of any other equipment.

A further object of the invention is to provide a lawn trimmer and edger employing a blade of such formation that the device may be used as a garden tool or as a weed trimmer or for removing weeds from a lawn.

A further object of the invention is to provide a device of this character which will be simple in construction and which may be quickly and easily attached to a lawn mower or otherwise placed in operation.

And a still further object of the invention is to provide a lawn trimmer and edger which, when not in use, may be quickly folded back on the handle of a lawn mower so that it will be out of the way.

Other and incidental objects of the invention not mentioned hereinabove will become apparent as the description of the invention proceeds.

My invention is illustrated in the accompanying drawing, wherein:

Figure 1 is a longitudinal sectional view of my improved lawn trimmer and edger as it would appear in operative position on a lawn mower.

Figure 2 is a horizontal sectional view on the line 2—2 of Figure 1, looking in the direction indicated by the arrows.

Referring now more particularly to the drawing, wherein like numerals of reference will be seen to designate like parts throughout the various views, the numeral 1 indicates, in general, a mower 1 which is of conventional design and includes a handle yoke 2, a handle 3, and a connecting rod 4. The connecting rod 4 is adapted to join the gear housings 5 which support the wheels 6 of the mower. The usual rotor blade is shown at 7.

In carrying my invention into effect, I provide a body which is indicated in general by the numeral 8. The body is, as best seen in Figure 3 of the drawing, substantially U-shaped in vertical cross section and is formed preferably of steel. The body is provided with substantially rectangular vertical and oppositely disposed upper portions 9 and said body is formed throughout substantially the lower half of its length with a rearwardly obliquely disposed blade 10. The blade is provided with a beveled sharpened cutting edge 11 throughout its length and, as will be seen clearly in Figure 2 of the drawing, the cutting edge will appear, in top plan, to be substantially V-shaped, the apex of the V appearing at the center of the blade at its lowermost extremity. Disposed on the upper portions 9 in horizontal alinement and near each vertical edge of said upper portions, are openings 12 arranged in vertically spaced series.

Carried on the body 8 near the mid-portion thereof; which is to say, near the junction between the upper portions 9 and the blade 10, is a circular edging disc 13 which is provided with a cutting edge 14. The edging disc 13 is adapted to abut the outer surface of the body and is held close thereto but is rotatably and removably mounted thereon by a bolt 15. An opening 16 disposed in axial alinement with the bolt 15 is formed in the opposite leg of the body 8 from the leg supporting the edging disc. The opening 16 is adapted to receive the bolt 15 removably therein for mounting the edging disc on said opposite leg when desired.

In order to support my improved lawn trimmer and edger in position on the lawn mower, I provide spaced companion mounting bars 17 which are twisted at their forward end portions and turned to form hooks 18. The hooks are adapted to snugly but removably engage the connecting rod 4 of the mower for supporting the forward end portions of the mounting bars. The mounting bars 17 are provided with upwardly oblique inwardly offset portions 19. For supporting the mounting bars at corresponding rear ends, I provide companion supporting bars 20 which are adapted to extend in close parallel spaced relation throughout substantially half their length and are adapted to have their lower end portions disposed between the free end portions of the offset portions 19 of the mounting bars 17. Hingedly connecting the supporting bars 20 with said mounting bars is a pivot bolt 21 which is provided with a clamping nut 22. Tightening of the clamping nut 22 on the bolt 21 will lock the supporting bars and the mount-bars as a unit. The supporting bars are formed at their corresponding upper end portions with outwardly offset portions 23 which terminate in parallel spaced upper end portions 24, which upper end portions are adapted to straddle the handle 3 at the junction of said handle and the yoke handle 2. The upper end portions 24 are provided with adjustment openings 25 and said openings are adapted to removably receive a locking bolt 26 which extends through the handle 3 and the upper end portions of the handle yoke 2 and, of course, through said upper end portions 24 of the supporting bars 20. Clamping nuts 27 are screwed on the opposite ends of the locking bolt 26 and are adapted to clamp the upper end portions of the supporting bars in firm relationship with the handle 3 of the mower. It will be understood that my lawn trimmer and edger will thus be firmly mounted on the mower 1. It should be further understood that, if desired, the device may be mounted on any suitable garden or farm implement which may be adapted for the purpose. That is to say, the device is not limited for use on lawn mowers although it has been found to very readily adapt itself for use with such machines.

In use, after the device has been mounted on the mower, as shown and described, and it is desired to remove a margin of sod along the edge of a sidewalk, the mower is swung to the position shown in Figure 1, for disposing the edging disc 13 in engagement with the sod. The body 8 will serve effectually to space the edging disc from the walk in the manner clearly shown in Figure 2 of the drawing, so that as said mower is moved along with a portion of its length resting on the walk and the remainder of its length resting on the sod, the edging disc will cut into the sod and the blade 10 will cut the sod between the edging disc and the walk. After the sod has been cut and it is desired to remove said cut portion from the trench formed by the cutting operation, the mower, with the device thereon, is drawn rearwardly and is tipped rearwardly somewhat for permitting the blade 10 to remove the cut sod from the trench. A clean cut, uniform trench throughout any desired length will be had by the use of my improved trimmer and edger.

The height of the body 8 may be varied simply by removing the body mounting bolts 28 from the openings 12 through which they extend. The body mounting bolts are adapted to be surrounded by spacing rings 29 which will prevent collapse of the body at the upper end portions when the bolts are in operative position. After the bolts have been removed, the body may be shifted upwardly or downwardly for raising or lowering the blade 10 and thereby varying the cutting depth thereof. When the desired adjustment has been made, it is only necessary to restore the bolts to their operative positions when they may be tightened by means of nuts 30 for firmly anchoring the body in position on the mounting bars 17. Further adjustment may be had by removing the locking bolt 26 from the upper end portion 24 of the supporting bar and then moving said supporting bar for alining either of the openings 25 with the opening in the handle 3, and then again restoring the locking bolt 26. It should, of course, be understood that the clamping nut 22 will have to be loosened before it will be possible to move the supporting bars 20 with respect to the mounting bar 17.

When the device is not in use, the clamping nut 22 may be loosened and the hooks 18 disengaged from the connecting rod 4 for permitting the swinging of the entire body and mounting bars to overlie the handle in inoperative position.

Having thus described the invention, what I claim is:

1. In a device of the class described, a substantially U-shaped body having rectangular upper portions formed with openings, said body having an obliquely rearwardly disposed blade, an edging disc carried by the body near one of said upper portions, companion mounting bars having hooks removably engageable with a connecting rod of a lawn mower, body mounting bolts selectively engageable through certain of said openings for adjustably mounting the body on said mounting bars, and companion supporting bars connecting said mounting bars with the handle of the mower for rigidly mounting the body in operative position connected with the mower, said edging disc being engageable with the material to be cut as the mower is moved forwardly for effecting an initial cutting operation and said blade completing the cutting operation and effecting the digging of a trench, said blade being adapted to cut material from the trench as the mower is moved in a reverse direction.

2. In a device of the class described, a U-shaped body obtuse angular in side elevation, said body having a rearwardly disposed blade formed with a V-shaped cutting edge, an edging disc carried by the body, mounting bars removably engageable with a connecting rod of a lawn mower, mounting bolts adjustably mounting the body on the mounting bars, and supporting bars connecting the mounting bars with the handle of the lawn mower for rigidly mounting the body in operative position connected with a mower.

WILLIAM P. HOUSER.